United States Patent [19]

Jordan

[11] Patent Number: 4,529,440

[45] Date of Patent: Jul. 16, 1985

[54] CHEMICALS FROM COAL

[76] Inventor: Robert K. Jordan, 3979 Tuxey Ave., Pittsburgh, Pa. 15227

[21] Appl. No.: 149,758

[22] Filed: May 14, 1980

Related U.S. Application Data

[63] Continuation-in-part of Ser. No. 926,904, Jul. 21, 1978, abandoned, which is a continuation of Ser. No. 758,081, Jan. 10, 1977, abandoned, which is a continuation-in-part of Ser. No. 936,221, Aug. 24, 1978, abandoned.

[51] Int. Cl.$^3$ .............................................. C21B 5/06
[52] U.S. Cl. ...................................................... 75/42
[58] Field of Search ...................................... 75/41, 42

[56] References Cited

U.S. PATENT DOCUMENTS

| | | | |
|---|---|---|---|
| 1,849,658 | 3/1932 | Brassert | 75/41 |
| 3,460,934 | 8/1969 | Kelmar | 75/42 |
| 3,814,404 | 6/1974 | Claflin | 75/42 X |
| 4,013,454 | 3/1977 | Jordan | 75/41 |

OTHER PUBLICATIONS

Okamoto et al., Tetsu-to-Hagane, pp. 122-132, 58, (1972), 637, English version, 8-6-73.

Primary Examiner—M. J. Andrews

[57] ABSTRACT

A process for the coproduction of molten ferrous metals and hydrogen-carbon monoxide adducts from a blast furnace whose hot blast is replaced by oxygen and a suspension of coal in recycle gas; whereby the top gas or gas removed from the stack at a point below where reduction begins is employed to produce chemicals of which hydrogen and/or carbon monoxide adducts are made.

13 Claims, No Drawings

CHEMICALS FROM COAL

This application is a continuation-in-part of Ser. No. 926,904, filed July 21, 1978, abandoned; which is a continuation of Ser. No. 758,081 filed Jan. 10, 1977, now abandoned; and which is a continuation-in-part of Ser. No. 936,221, filed Aug. 24, 1978, abandoned.

This invention relates to a process for simultaneously producing a ferrous metal and carbon monoxide adducts with hydrogen and other chemicals by operation of a modified blast furnace with oxygen and a suspension of carbonaceous fines, ideally coal, in recycle top or stack gas instead of the conventional hot blast, to provide a top gas or stack gas rich in carbon monoxide that is convented with hydrogen from the coal or shifting carbon monoxide or other chemicals such as methanol to carbon monoxide adducts.

The conventional blast furnace is operated by charging a ferrous ore, fluxing agent and coke at the top whist injecting through the tuyeres a hot blast of air, typically at about 1800° F. and 2 atms. abs. pressure to provide molten iron containing typically from about 4 to about 8% carbon, depending on the alloying metal present, e.g. manganese. A top gas to typically 25% carbon monoxide, 15% carbon dioxide and 60% nitrogen is obtained. Although the carbon dioxide is easily and economically removed from the carbon monoxide, the nitrogen is very difficult and costly to separate. As a result, the top gas is not employed as a source of chemicals in the commercial production of carbon monoxide based chemicals. Indeed, the top gas from a ton of a molten ferrous metal typically contains about two thirds to three fourths of a ton of carbon monoxide, but it is diluted by some 1.7 tons of nitrogen and 1 ton of carbon dioxide.

Again, while the carbon dioxide is easily removed, the residual carbon monoxide-nitrogen mixture is not readily converted to carbon monoxide adducts, for example with methanol to either of methyl formate or acetic acid, at low pressures and in high yields. In the production of methyl formate from such top gas and methanol, it is necessary to employ a pressure of about or greater than 2500 psig in order to achieve high carbon monoxide conversion. Likewise, for acetic acid, methanol from hydrogen and carbon monoxide, and for numerous other carbon monoxide adducts.

In the top gas from a conventional blast furnace there is practically no hydrogen unless substantial quantities of steam are injected with the hot blast.

Therefore, it is an object of my invention to provide an improved process for the production of adducts or carbon monoxide.

It is another object of my invention to provide an improved process for the production of hydrogen-carbon monoxide adducts from the hydrogen contained in coal.

My invention is a process for the production of molten ferrous metals and carbon monoxide adducts comprising, operating a blast furnace by charging a ferrous ore, fluxing agent and coke at the top whist injecting oxygen of at least 65% purity and a suspension of carbonaceous fines in recycle gas from the top or from the stack in place of the hot blast, to produce a ferrous metal and a top or stack gas rich in carbon monoxide, treating the gas to adjust the carbon monoxide concentration and remove undesirable compounds, and combining the carbon monoxide and adducting chemical in an appropriate reactor to produce the desired carbon monoxide adduct.

I have discovered that by operating a blast furnace with oxygen using top gas or stack gas to adjust the oxygen concentration in the raceways, that the gas from the combustion zone is essentially carbon monoxide; and when coal or other carbonaceous material is suspended in the recycle gas whatever its hydrogen content only slightly affects the carbon monoxide concentration.

For this reason, reduction takes place higher in the stack than in the conventional blast furnace and the rate is much greater; more, the high carbon monoxide concentration inhibits the well known but mis-named "direct reduction" reaction. This really is the reaction between coke carbon and carbon dioxide which emanates from the reduction, a very endothermic process consuming typically 1.1 MM Btu's/THM (ton of hot metal) high temperature heat and about 200 pounds/THM coke in the conventional blast furnace process. By essentially obviating the nitrogen whose high partial pressure causes the $C+CO_2====2CO$ to go to the right, reducing the amount of coke available in the burden by injecting carbon, and increasing the proportion of reduction that takes place below about 2000° F. where the reaction begins, the reaction is practically eliminated.

As the minimum amount of high temperature heat required in the conventional blast furnace process is about 4.3 MM Btu's/THM, the high temperature heat consumed by my process is greatly reduced. Indeed, eliminating the carbon dioxide-carbon reaction effects greater heat transfer in the stack resulting in more rapid rates of hot metal production, ergo less wall and tuyere heat loss/THM, and that the amount of gas required to hold the high temperature heat needed is greatly diminished, the loss of sensible heat in the top gas is lessened. By the use of oxygen and recycle gas of essentially carbon monoxide and carbon dioxide, as little as 2.5 MM Btu's/THM of high temperature heat is required.

The oxygen concentration becomes critical in that as little as 621 pounds carbon and 828 pounds, 9,936 scf, oxygen is required that results in 1,449 pounds, 19,345 scf, carbon monoxide in the combustion zone; but this is just about the amount of carbon monoxide required to reduce the iron oxide necessary for the production of a ton of hot metal, 18,000 scf/THM for magnetite and about 20,000 scf/THM for hematite. While 30,000 scf carbon monoxide and/or nitrogen is required to hold the 2.5 MM Btu's/THM high temperature heat at the ideal flame temperature of 4000° F., the conversion of at least 18,000 scf/THM of carbon monoxide only would result in a top gas of about 10,000 to 12,000 scf carbon monoxide and 18,000 scf carbon dioxide or more were oxygen of 100% purity employed. But wereoxygen of 65% purity employed the 5,000 scf initially in the stack from the injected oxygen plus than in recycling top gas would produce a carbon monoxide-nitrogen mixture, after carbon dioxide removal, of about 40% or less carbon monoxide concentration and the quantity of carbon monoxide recovered would be negligible. It is therefore critical to employ oxygen of over 65% purity.

Ideally, the amount of heat consumed in the process should be increased which is quite different from the conventional blast furnace process where heroic efforts are directed to reducing the amount of high temperature heat required for the process. Increased heat consumption can be effected by increasing the amount of heat removed from the process; thus by taking gas from the stack at a level below that which reduction begins, its sensible heat represents a loss which must be made up by increasing the amount of oxygen and carbon employed. Ideally the gas is removed at a level in the stack below that where significant reduction takes place, ergo the gas removed is essentially carbon monoxide undiluted by carbon dioxide. Were substantially pure oxygen employed, the only diluent of consequence would be the little hydrogen contained in injected coal. As even high volatile bituninous coal contains roughly 5% hydrogen, at 1000 pounds/THM coal injection, the hydrogen would come to 9,400 scf injected. Assuming 12,000 scf such stack gas were removed at the 3000° F. level the 0.72 MM Btu's/THM would increase the carbon monoxide available in the combustion zone by 8,570 scf, i.e. 38,570 scf total instead of 30,000 scf to hold the heat.

The carbon monoxide concentration of the gas removed from the stack would be roughly 75%; that in the top gas would be about 50% after carbon dioxide removal. However, the coal typically employed would be of a range of some 2% to 5% and usually from 2% to 4%, so that the carbon monoxide obtained would be considerably higher in concentration. Indeed, were coke breeze to be injected the hydrogen content would be nil.

Clearly the carbon monoxide concentration of the gas removed from the stack may range from about 65% to practically 100%, whist that in the top gas, after carbon dioxide removal would not be greatly lower. To make methyl formate from methanol and such a gas, which has been cleansed to remove particulate matter, acid gases and water, using sodium methylate as a catalyst at about 100° C., only about 400 psig pressure would be required. Similarly treated conventional blast furnace top gas would require a pressure of some 2500 psig or more to effect high carbon monoxide conversion, and the residual gas would be useless. Whereas by my process the residual gas would be comprised essentially of unreacted carbon monoxide of high purity, or diluted by only hydrogen which would represent a "synthesis gas". By so using a gas of carbon monoxide and hydrogen obtained in my process and removing a portion of the carbon monoxide by reaction with methanol, ammonia or other chemical that forms adducts while being relatively inert to hydrogen, a gas of varying concentrations of hydrogen and carbon monoxide can be obtained ranging from about 20% to some 95% carbon monoxide.

For example then, such a residual gas of about 67% hydrogen and 33% carbon monoxide can be reacted directly to methanol under well known conditions. As coproducts then using methanol to adjust the carbon monoxide concentration either of methanol or methyl formate can be made. Using ammonia will give formamide.

Another method from increasing the amount of heat required in the blast furnace process is to increase the amount of slag coproduced, ideally by adding lime or a form of lime such as fluxed sinter, limestone, and the like so that instead of only 500 to 700 pounds slag/THM is obtained, about 900 to 1500 pounds is obtained of a slag which is more basic and useful for other reasons. Thus, the amount of heat removed is typically increased by from about 0.1 to about 0.7 MM Btu's/THM; ergo the amount of gas required from the combustion zone likewise increased.

Clearly by increasing the tapping temperature of both the hot metal and slag, for example from about 2500° to 2800° F. of the conventional blast furnace process to some 3000° to 4000° F., an increased heat consumption of up to almost 1 MM Btu's/THM can be effected.

By these methods for increasing the amount of high temperature heat a higher concentration of carbon monoxide is realized in the top gas, larger quantities of carbon monoxide are obtained or recovered and when coal or other hydrogen containing carbonaceous fuel is used, the hydrogen concentration is somewhat lower. But the quantity of hydrogen is constant.

Through the injection of coal as a suspension in recycle top or stack gas, that hydrogen contained in the coal can greatly minimize the amount of carbon monoxide that needs to be shifted in the production of synthesis gas for use in the production of methanol, oxo alcohols, ethylene glycol, formaldehyde, glyoxal and even ammonia from the resulting top or stack gas. To illustrate, if a recovered gas of 16,000 scf carbon monoxide and 5,000 scf hydrogen is realized after carbon dioxide removal from a ton of hot metal, by shifting with steam about 9,000 scf carbon monoxide therein to result in a mixture of 14,000 scf hydrogen, 7000 scf carbon monoxide and 9,000 scf carbon dioxide which after carbon dioxide removal would yield from a methanol reactor 7,000 scf methanol.

At the same energy level use in the blast furnace of my invention, it would be necessary to employ more carbon, and oxygen, to realize the 21,000 scf carbon monoxide recovered and in shifting the 14,000 scf to 14,000 hydrogen and 14,000 scf carbon dioxide, it would clearly be necessary to remove more carbon dioxide which would be more costly. In other words, the hydrogen in the coal comes as a bonus to the process and reduces the amount of carbon monoxide needed to be recycled. The amount of carbon monoxide available from the process at any given energy level is strictly a function of the ore, flame temperature and quantity recycled; more simply of the amount of carbon consumed.

To illustrate the point were an energy level of 4.026 MM Btu's/THM employed using a flame temperature of 4000° F. and a minimum of carbon and oxygen it would be necessary to use 1,000 lbs. carbon. Injecting coke breeze which contains essentially no hydrogen would give 47,930 scf carbon monoxide of which 23,710 scf would be provided by the partial combustion whist the difference 25,220 scf would be recycled. Using coal instead of coke breeze to the extent of 1000 pounds/THM and containing 4% hydrogen, the 7,520 scf hydrogen evolved would less by that amount the recycle carbon monoxide-hydrogen required by that amount, ergo increasing the amount recovered. Roughly 5,000 scf carbon monoxide would be recovered using coke breeze, while some 12,000 scf carbon monoxide-hydrogen would be recovered using the coal in terms of top gas.

Of course, gas removed from the stack can be employed to provide the recycle gas, but all things being equal the total recovered carbon monoxide and hydrogen will be greater from the coal. While the flame temperature employed in the process may range from about 3300° to about 4500° F., it is preferable to operate at 3500° to about 4100° F. And while the higher the pressure of the furnace operation the better for subsequent syntheses because less additional pressure needs be added to arrive at the subsequent process temperature, most blast furnaces are now limited to well below 100 psig by design.

Combining the production of chemicals based on carbon monoxide with the production of ferrous metals promises to conserve valuable natural gas while reducing their costs. Injecting coal provides a very inexpensive source of hydrogen that clearly results in increased yield of products as compared to even injecting coke breeze. And yet the hydrogen is not so great in concentration as to significantly affect the carbon monoxide concentration in most practical cases.

Thus in the production of methanol from the top and stack gases from coal injection a higher yield can be realized. Yet in producing acetic acid or methanol from the gas using methanol with the appropriate catalyst in reactors appropriate to their production, the hydrogen will be of such concentration as to enable a high concentration of carbon monoxide easily combined under mild pressure conditions to result in high carbon monoxide conversion; and the residual gas will have a higher hydrogen concentration and be useful in the synthesis of methanol, oxo alcohols when the gas is combined with olefins or alcohols, and formaldehyde and glyoxal when irradiated with ultraviolet light of less than about 3000 angstroms in the presence of an appropriate sensitizer.

According to the provision of the patent statutes I have explained the principle of my invention and have illustrated and described what I now consider to represent its best embodiment. However, I desire to have it understood that within the scope of the appended claims the process may be practiced otherwise.

I claim:

1. An improved process for the production of carbon monoxide adducts in producing molten ferrous metals of about or over 4% carbon in a blast furnace in which the hot blast is replaced by injecting oxygen of over 65% purity and a solid carbonaceous fuel suspended in recycle gas, the improvement comprising increasing the oxygen and total carbonaceous fuel consumed whilst removing the additional heat produced without substantially increasing the top gas temperature and employing the additional gas thereby produced comprising carbon monoxide to combine with a chemical that forms an adduct with carbon monoxide to produce the adduct and separating the adduct from the residual gas whose carbon monoxide is employed to make other adducts or is used as a fuel.

2. The process of claim 1 where the carbonaceous fuel is coal.

3. The process of claim 1 where the chemical employed is methanol in the presence of an appropriate catalyst to produce methyl formate or acetic acid.

4. The process of claim 3 where the chemical employed is methanol to produce methyl formate or acetic acid and the residual carbon monoxide and the hydrogen from the coal, in higher hydrogen to carbon monoxide ratio than in the off-gas, is combined to produce a hydrogen-carbon monoxide adduct.

5. The process of claim 4 where the hydrogen-carbon monoxide adduct is methanol.

6. The process of claim 4 where the hydrogen-carbon monoxide adduct is glyoxal or formaldehyde.

7. The process of claim 4 where the hydrogen-carbon monoxide adduct is ethylene glycol.

8. The process of claim 4 wherein the hydrogen to carbon monoxide ratio is further increased by shifting a portion of the residual carbon monoxide with steam to hydrogen.

9. The process of claim 2 wherein a portion of the off-gas carbon monoxide is shifted with steam to result in a ratio of hydrogen to carbon monoxide suitable for producing methanol and combining the hydrogen and carbon monoxide to produce methanol.

10. The process of claim 1 wherein the additional heat removed is in the form of gas removed from the stack at a level below that of substantial reduction and is comprised of essentially carbon monoxide.

11. The process of claim 10 wherein the the carbon monoxide removed from the stack is combined with a chemical that forms an adduct to carbon monoxide to produce the adduct.

12. The process of claim 1 where the additional heat removed is removed by increased slag production.

13. The process of claim 1 where the additional heat removed is removed by tapping the slag and hot metal at a temperature in the range of from about 3000° F. to about 4000° F.

* * * * *